(12) United States Patent
Pradas et al.

(10) Patent No.: US 8,737,241 B2
(45) Date of Patent: May 27, 2014

(54) FAST ACCESS TO A DEDICATED UPLINK (E-DCH) RESOURCE BY USING A PREVIOUSLY USED CONFIGURATION

(75) Inventors: Jose Luis Pradas, Jorvas (FI); Johan Bergman, Stockholm (SE); Stefan Wager, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 323 days.

(21) Appl. No.: 12/681,927

(22) PCT Filed: Jul. 4, 2008

(86) PCT No.: PCT/EP2008/058692
§ 371 (c)(1),
(2), (4) Date: Apr. 7, 2010

(87) PCT Pub. No.: WO2009/047025
PCT Pub. Date: Apr. 16, 2009

(65) Prior Publication Data
US 2010/0215005 A1    Aug. 26, 2010

Related U.S. Application Data

(60) Provisional application No. 60/978,217, filed on Oct. 8, 2007.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)
*H04W 4/00* (2009.01)
*H04W 72/00* (2009.01)
*H04B 7/00* (2006.01)

(52) U.S. Cl.
USPC ........ 370/252; 370/329; 370/236.1; 455/450; 455/509

(58) Field of Classification Search
USPC ............................ 370/252, 329; 455/450, 509
See application file for complete search history.

(56) References Cited

U.S. PATENT DOCUMENTS

2005/0068922 A1* 3/2005 Jalali ............................. 370/335
2005/0254462 A1* 11/2005 Gopal ........................... 370/335
2007/0153747 A1* 7/2007 Pan et al. ...................... 370/338
2008/0311923 A1* 12/2008 Petrovic et al. ............... 455/450

* cited by examiner

*Primary Examiner* — Alpus H Hsu
*Assistant Examiner* — Yee Lam (57) ABSTRACT

A user equipment (UE), a base station and methods for enabling providing fast access to a dedicated uplink (UL) resource between the base station and the UE for data transmissions, by using a UE identifier. The UE may receive configuration parameters of a set of common UL resources from the base station, transmit a random access request for a common UL resources of said set of common UL resources to said base station, obtain allocation of said common resource of said set from said base station, and transmit a UE identifier to said base station on said common resource wherein the UE identifier indicates a previously used set of configuration parameters for a dedicated resource.

9 Claims, 8 Drawing Sheets

FAST ACCESS TO A DEDICATED UPLINK (E-DCH) RESOURCE BY USING A PREVIOUSLY USED CONFIGURATION

This application claims the benefit of U.S. Provisional Application No. 60/978,217, filed Oct. 8, 2007, the disclosure of which is fully incorporated herein by reference.

TECHNICAL FIELD

The present invention relates in general to a method and arrangement in a telecommunications system, in particular to a method and arrangement for providing fast access to a dedicated uplink resource between a UE and a base station for data transmissions in a telecommunications system.

BACKGROUND

A User Equipment (UE), sometimes called mobile station or terminal, in connected mode can be tracked either on cell level, which means that the Radio Network Control (RNC) keeps track of in which cell the UE is located, or on Universal Mobile Telecommunications System (UMTS) Terrestrial Radio Access Network (UTRAN) Registration Area (URA) level. A URA covers a number of cells. In the states URA_PCH and CELL_PCH (PCH=Physical Channel) there are no possibilities to send user data. The RNC can only reach the UE by means of UTRAN paging. In CELL_FACH (FACH=Forward Access Channel) state the UE has been assigned a common Random Access Channel (RACH) that can be used for user data transmission in Uplink (UL).

However, special channel access procedures such as power ramping, collision avoidance and contention resolution must be used before uplink data transmission can begin, as multiple terminals share the channel. The channel assigned for downlink data (Forward Access Channel, FACH) is also shared by multiple terminals, but access to it is scheduled by the RNC. In the state CELL_DCH (DCH=Dedicated Channel) a dedicated or shared physical channel has been assigned to the UE.

Previous to Rel-7 (Release 7 of 3GPP TS 25.214 "Physical layer procedures" (FDD)), a UE which was in state CELL__FACH had to switch to state CELL_DCH in case the UE wanted to read High Speed-Shared Control Channel/High Speed-Downlink Shared Channel (HS-SCCH/HS-DSCH). This implied that several control messages had to be exchanged between the UE and the Base Station also called Node-B or evolved Node-B (eNode-B) in Long Term Evolution (LTE), and between Node-B and RNC; therefore delays were considerably large. Release 7 introduced a feature in which Node-B could address a UE using the HS-SCCH/HS-DSCH while the UE's state was CELL_FACH. As a result, delays were reduced and performance improved.

However, UE may address the Node-B when the UE has data to be transmitted. If the UE is in state CELL_FACH, the UE needs to access the network through a Random Access Channel (RACH) procedure, synchronize in both Uplink (UL) and Downlink (DL), and move to state CELL_DCH, in order for the UE to start transmitting data. This procedure also requires some exchange of control messages between Node-B and RNC.

One disadvantage with the RACH procedure is emphasized when the UE needs to transmit bursty traffic, i.e. relatively small amount of data per non-defined time period, such as web browsing traffic.

In this case a UE whose state is CELL_FACH needs to switch to CELL_DCH state before it can send anything but very small amount of data. The procedure of switching may take several hundreds of milliseconds. This is highly inconvenient when UE has relatively small amount of data to be sent, but still more than is feasible to transmit on current RACH, as the experienced throughput would be very low due to the large set-up time.

After sending the data, UE will eventually transit again to state CELL_FACH after the inactivity period has expired. When the UE needs to send data once more, it will have to go through the same procedure again.

SUMMARY

The present invention aims at providing a solution that at least to a certain extent alleviates the problems indicated above.

According to a first aspect of the present invention, there is provided a method in a base station for obtaining a UE identifier enabling provision of fast access to a dedicated UL resource to a UE for data transmissions. In this method the base station transmits configuration parameters of a set of common UL resources to the UE. This UE sends a random access request for a common resource to the base station, the reason of which the common resource request is now received in this method. The base station then determines whether or not at least one of the common resources of the set of common UL resources is available. In case at least one of the common resources is available, the base station allocates an available common resource to said UE. Moreover, the base station receives a UE identifier from the UE transmitted on said allocated common resource, where the UE identifier indicates a previously used set of configuration parameters for a dedicated resource, which enables the UE to use the previously used configuration parameters.

In at least some embodiments of this aspect, the UE identifier that is received from the UE may comprise an Enhanced Dedicated Channel (E-DCH) Radio Network Temporary Identity (E-RNTI).

The base station may determine, based on the UE identifier, whether or not said UE has previously used a certain set of configuration parameters for a dedicated resource, in at least some embodiments of this aspect. In case the UE has previously used a certain set of configuration parameters, the base station may order said UE to apply said set of previously used configuration parameters for providing said dedicated UL resource to the UE for data transmissions.

In at least some embodiments of this aspect, the base station may transmit the configuration parameters of the set of common UL resources to the UE on a broadcast channel. Alternatively, the Node-B may transmit the configuration parameters of the set of common UL resources to said UE on at least one of a High Speed-Shared Control physical Channel (HS-SCCH) and a High Speed-Downlink Shared Channel (HS-DSCH).

The base station may transmit the common resource allocation to said UE on an Acquisition Indicator Channel (AICH), in at least some embodiments of this aspect.

The set of configuration parameters may comprise a configuration identifier and at least one of a set of channelization codes, timing indicators, offsets and a signature sequence, in at least some embodiments of this aspect, According to a second aspect of the invention, there is provided a method in a user equipment, UE, for providing an identifier of said UE enabling provision of fast access to a dedicated UL resource to a base station for data transmissions. In this method the UE receives configuration parameters of a set of common UL resources from said base station. The UE also transmits a random access request for a common resource of the set of common UL resources to said base station. Moreover, the UE obtains allocation of said common resource of the set f common UL resources, from the base station. In addition, the UE transmits a UE identifier to said base station on said common resource, where the identifier indicates a previously used set of configuration parameters for a dedicated resource.

In at least some embodiment of this aspect, the UE identifier that the UE transmits may comprise an E-RNTI.

In at least some embodiment of this aspect, within the method the UE may receive an order from said base station to apply said previously used set of configuration parameters for providing said dedicated UL resource for data transmissions.

In at least some embodiment of this aspect, the UE may receive configuration parameters of the set of common UL resources which are sent by the base station on a broadcast channel. Alternatively, the UE may receive the configuration parameters of the set of common UL resource on at least one of a High Speed-Shared Control Channel (HS-SCCH) and a High Speed-Downlink Shared Channel (HS-DSCH).

The UE may obtain the allocation from the base station on the Acquisition Indicator Channel (AICH), in at least some embodiment of this aspect.

According to a third aspect of the invention, there is provided a base station that may be capable of providing fast access to a dedicated UL resource to a user equipment, UE, for data transmissions. The base station may be arranged to perform method steps of the first aspect of the present invention, according to this third aspect.

According to a fourth aspect of the invention, the UE may be capable of providing fast access to a dedicated UL resource to a base station for data transmissions. According to this aspect the UE may be arranged to perform method steps of the second aspect of the present invention.

The various embodiments of the present invention provide the advantages of reducing the UL set-up delays and consequently improve the performance from the network perspective and the quality of experience from the end-user perspective.

The features described above in relation to the method may, where applicable, also be implemented in an arrangement according to the invention with the same or similar advantages as described in relation to the method.

It goes without saying that the above mentioned embodiments may be combined in the same embodiment. In the following, preferred embodiments of the invention will be described with reference to the drawings.

It should be emphasized that the term "comprises/comprising" when being used in the specification is taken to specify the presence of the stated features, integers, steps or components but does not preclude the presence or addition of one or more other features, integers, steps or components or groups thereof.

BRIEF DESCRIPTION OF DRAWINGS

In order to explain advantages and features of the present invention herein in more detail a few embodiments will be described below, where references are made to the accompanying drawings, for which

ABBREVIATIONS

ACK Acknowledgment
AICH Acquisition Indicator Channel
ARQ Automatic Repeat Query
C-RNTI Cell Radio Network Temporary Identity
DL Downlink
DTX Discontinuous Transmission
E-AGCH E-DCH Absolute Grant Channel
E-DCH Enhanced Dedicated Channel
E-HICH E-DCH Hybrid ARQ Indicator Channel
E-RNTI E-DCH Radio Network Temporary Identity
E-TFCI E-DCH Transport Format Combination Indicator
F-DPCH Fractional Dedicated Physical Channel
FACH Forward Access Channel
HS-DSCH High Speed Downlink Shared Channel
HS-SCCH High Speed Shared Control Channel
NACK Negative Acknowledgment
P-CCPCH Primary Control Common Physical Channel
PRACH Physical Random Access Channel
RACH Random Access Channel
Rel-7 Release 7 of 3GPP TS 25.214
Rel '99 Release 1999 of 3GPP TS 25.214
RNC Radio Network Controller
UE User Equipment
UL Uplink

DETAILED DESCRIPTION

Briefly described, the present invention relates to a method, a User Equipment (UE) and a base station at least in some way adapted to provide a dedicated uplink resource for data transmissions between a UE and a base station. More specifically the present invention presents methods and means for providing the dedicated UL resource in a faster way than previously known, to the best of the applicant's knowledge.

In Release 7 of 3GPP TS 25.214 the downlink (DL) between the Node-B and a UE is improved.

The present invention however proposes to improve the uplink (UL) between the UE and the Node-B. The UE should be able to send UL data in CELL_FACH (Cell Forward Access Channel) with higher throughput than what is currently possible. For this purpose, UE will need to use E-DCH as soon as possible and without transiting to CELL_DCH since moving to CELL_DCH would imply communication with the RNC, which would incur time delays and non-optimal utilization of signalling resources. For this reason, this procedure could be called "fast E-DCH access"

Figure 1:
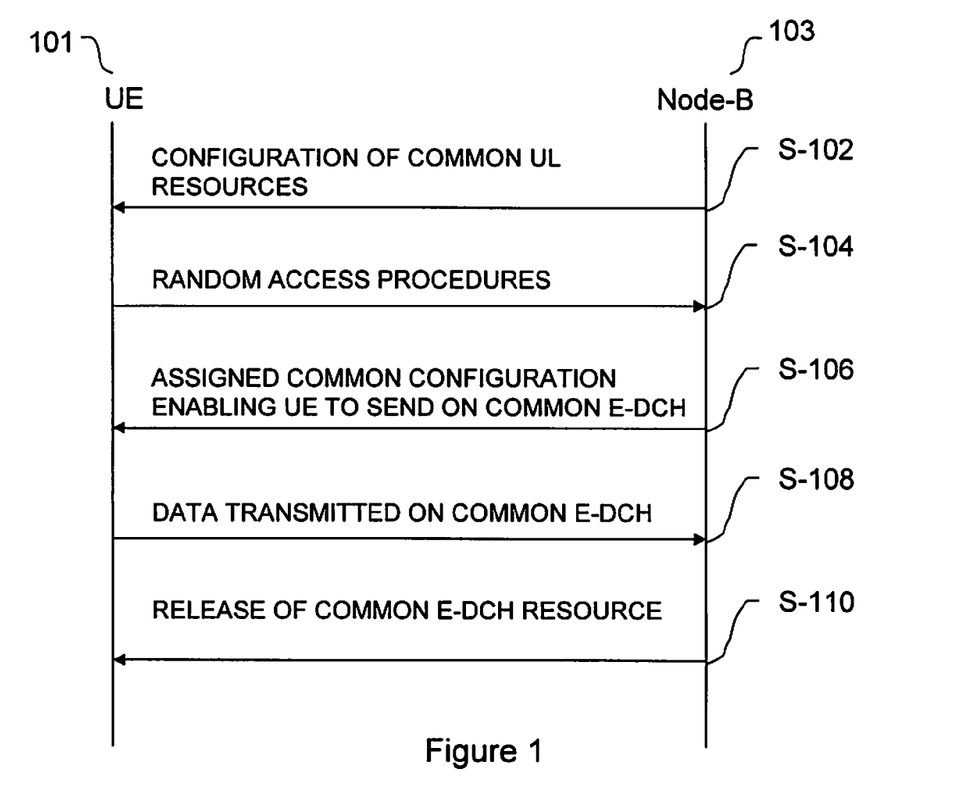
FIG. 1 illustrates a basic signalling scheme of the present invention.

In FIG. 1, a basic signalling scheme for signalling for providing fast access to a dedicated UL resource to a UE, between a UE 101 and a Node-B 103 of the present invention is illustrated. A brief description of the comprised signalling follows below.

In signal S-102, Node-B 103 broadcasts a configuration of common UL resources to at least UE 101. These UL resources typically comprise common E-DCH resource that can be used for uplink traffic in CELL_FACH.

In signal S-104, the UE 101 initiates Random Access Channel (RACH) procedures.

In signal S-106, the Node-B 103 sends a response to the UE 101, comprising an assigned common configuration for enabling the UE to send its data on the common E-DCH resource. The response may also comprise codes, timing offsets and any other additional information to the UE 101 enabling the UE 101 to transmit its data on said common E-DCH.

There is thus here no need to interact with the Radio network Controller (RNC) in order to send signals on the common E-DCH resource.

The UE 101 can now in signal S-108 transmit its data using the common E-DCH resource to the Node-B 103.

When the UE 101 has finished sending packets on the allocated common E-DCH resource, the Node-B 103 may release the common E-DCH resource in signal S-110.

These signals may be communicated in an order different to the one as presented. For instance, the common E-DCH configuration parameters may be provided in signal S-106. i.e. the Node-B's response to the RACH procedure as signalled in S-104 by UE 101.

Figure 2:
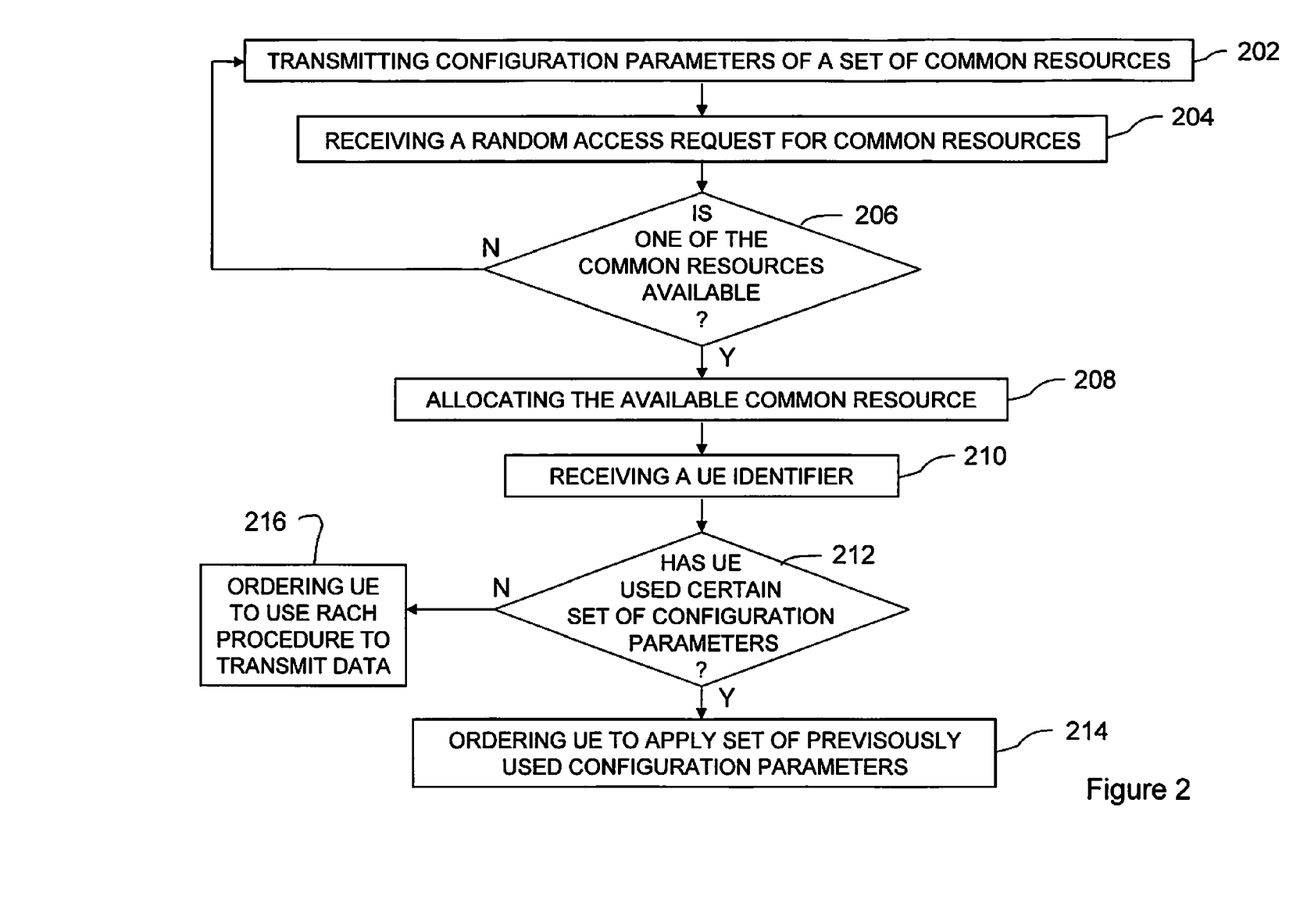
FIGS. 2 and 3 illustrate flow-charts of method steps according to some embodiments of the present invention.

In order to describe a few embodiments in more detail, method steps of a base station or a Node-B, for obtaining a user identifier enabling provision of fast access to dedicated UL resource to a UE, will be described. Reference is made to FIG. 2 illustrating said method steps.

In FIG. 2, the first step is the step of transmitting a message comprising configuration parameters of a set of common available resources by a Node-B, step 202. This step corresponds to signal S-102 comprising configurations of common UL resources, as sent by the Node-B 101 in FIG. 1.

It should already at this stage be pointed out that further information and details will be provided in connection to FIGS. 5-9 of preferred embodiments as described further down.

As a response to the message from the Node-B 103, this Node-B 103 may receive a random access request for common resources in step 204, which step corresponds to the signal S-104 relating to random access procedures as sent from the UE 101 as shown in FIG. 1.

Having received this request the Node-B 103 may determine whether at least one common resource is available to the UE 101, or not. This is performed in step 206. In case at least one common resource is available, the Node-B 103 allocates this common available resource to the UE 101, in step 208.

The corresponding step of signal in FIG. 1 is signal S-106 of assigned common configuration enabling the UE to send data on the common E-DCH resource.

As a response to the allocation in step 208, the Node-B 103 may receive a UE identifier, which may be the E-DCH Radio Network Temporary Identity (E-RNTI) identifier from said UE 101, in step 210.

The correspondence to step 210 can in FIG. 1 be found in signal S-108 wherein the UE 101 transmits data on the common E-DCH resource.

Based on the E-RNTI identifier the Node-B 103 can determine whether the UE 101 has used a certain set of configuration parameters or not in step 212.

In the case the UE 101 has used a certain set of configuration parameters the Node-B 103 orders the UE 101 to apply said set of configuration parameters in step 214.

In the case the Node-B 103 determines that UE has not used a certain set of configuration parameters, in step 212, the Node-B 103 orders the UE 101 to use the Random Access Channel (RACH) procedure to transmit data in step 216.

It can be mentioned that the basic signalling scheme as illustrated in FIG. 1, does not explicitly comprise the UE identifier enabling the Node-B to allow a previously used set of configuration parameters, to be used by the UE for the usage of the UE's own E-DCH resource to send data to the Node-B. This UE identifier, which may be the E-DCH Radio Network Temporary Identity (E-RNTI), is however comprised in the steps and signals of the subsequent figures, where embodiments of the present invention are described in more detail.

By referring to FIG. 2 method steps for the Node-B have thus been described.

Figure 3:
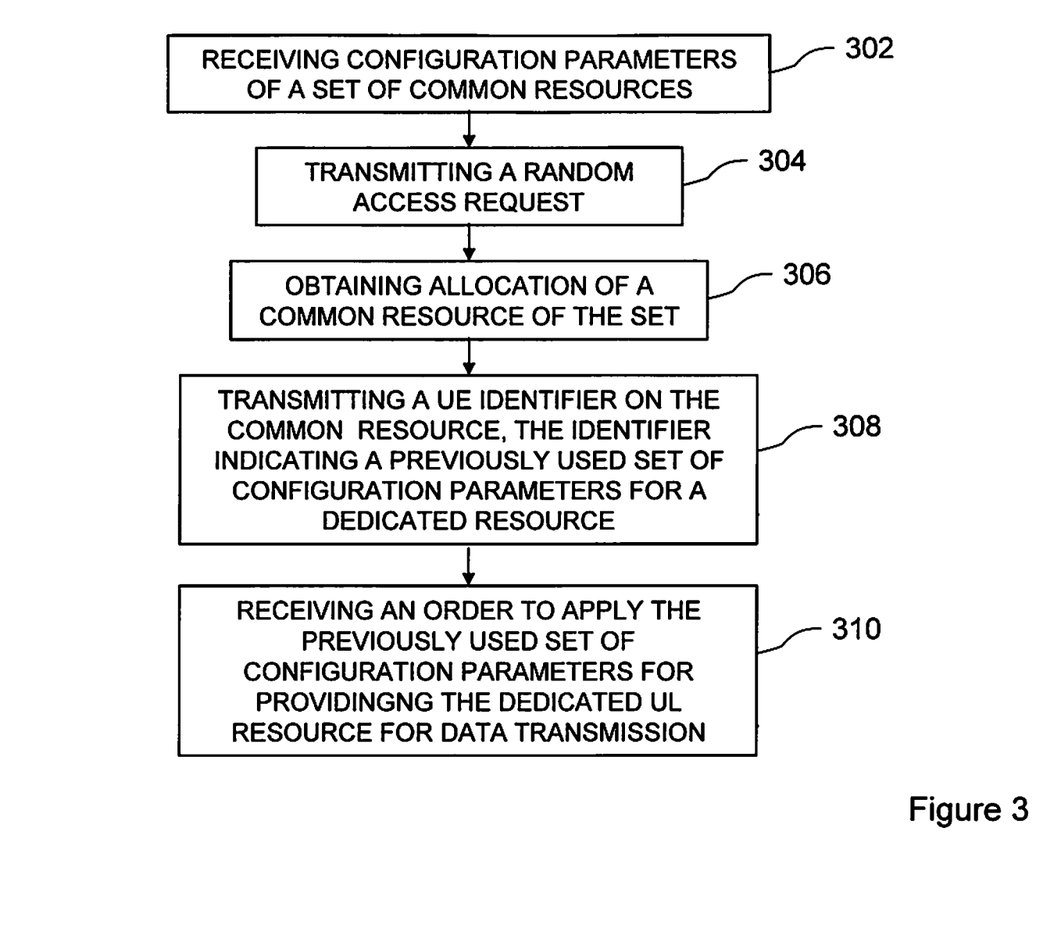

The corresponding steps of the UE will now be described with reference to FIG. 3 illustrating method steps for providing an identifier of the UE 101 enabling provision of fast access to a dedicated UL resource to a Node-B 103 for data transmission.

The method steps in FIG. 3 are now described.

In step 302 the UE 101 may receive configuration parameters of a set of common resources from the Node-B 103.

This step thus corresponds to signal S-102 in FIG. 1 where the UE 101 received configuration of common UL resources.

If the UE 101 wishes to transmit data, the UE 101 may transmit a random access request in step 304. This request is typically sent on the Physical Random Access Channel (PRACH).

Again, the correspondence in FIG. 1 can be found in signal S-104 where the UE 101 performs random access procedures.

As a response to the random access request, the UE 101 may receive allocation of common resources in step 306, which matches the signal S-106 in FIG. 1.

The configuration parameters as obtained above in step 302 may alternatively be received in step 306 of obtaining allocation of common resource of the set of common resources. Further down, embodiments will be described in which configuration parameters are transmitted by a Node-B subsequent to receiving a random access request from the UE.

Having received allocation of common resources the UE 101 transmits a UE identifier, which may be the E-RNTI identifier, on the common resource in step 308. This identifier indicates a previously used set of configuration parameters for a dedicated resource. This set of configuration parameters may be sent from the Node-B 103 to the UE 101 by using the Fractional Dedicated Physical Channel (F-DPCH) channel, as will be indicated below in connection with FIGS. 8 and 9.

The step 308 has its correspondence in the signal S-108 in FIG. 1 for which data is transmitted on the common E-DCH resource.

Subsequent to transmitting the UE identifier the UE 101 may receive, from the Node-B 103, an order to apply the previously used set of configuration parameters for providing the dedicated uplink (UL) resource for data transmission, in step 310.

Method steps of both the UE 101 and the Node-B 103 have thus briefly been described with reference to FIGS. 2 and 3.

Figure 4:
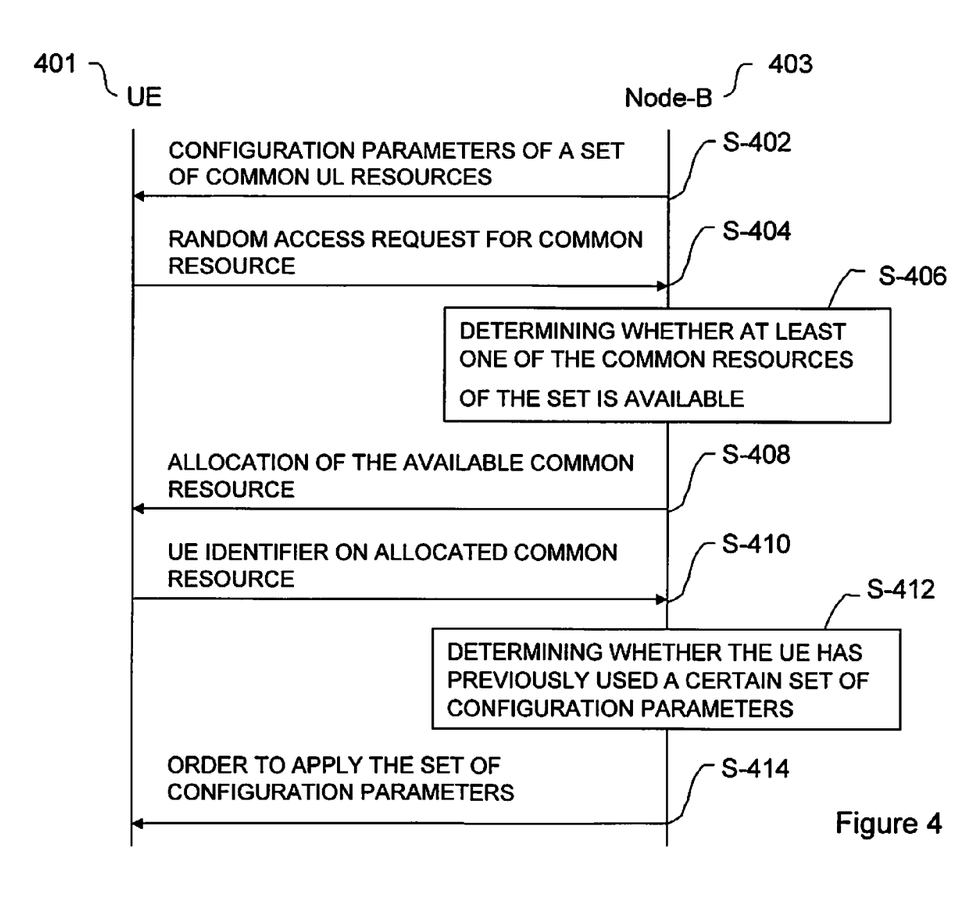
FIG. 4 illustrates a signalling scheme according to some embodiments of the present invention.

In order to link the different method steps with one another and to further provide an illustration of some embodiments of the present invention, a signalling scheme illustrating the signals sent and steps taken by the UE 401 and by the Node-B 403, is presented in FIG. 4.

At first, the configuration parameters of a set of common UL resources may be communicated from the Node-B 403 to the UE 401 in signal S-402.

This signal corresponds to signal S-102 in FIG. 1.

Thereafter, the random access request for common resource is communicate from the UE 401 to the Node-B 403 in signal S-404, which finds its correspondence in signal S-104 of FIG. 1.

Having received the random access request for common resource by the Node-B 403, said node may now determine whether at least one of the common resources is available, or not, in S-406.

In case at least one common resource is available, the Node-B 403 can communicate allocation of common available resource to the UE 401 in signal S-408. This signal compares with signal S-106, assigned common configuration enabling the UE 101 to send data on the common E-DCH resource.

As briefly described above, the UE 401 may then identify itself by transmitting its UE identifier on the allocated common resource in signal S-410. According to at least some embodiments of the present invention, the UE identifier comprises the E-DCH Radio Network Temporary Identity (E-RNTI) identifier.

A corresponding signal can be found in signal S-108 wherein data is transmitted on the common E-DCH resource, as shown in FIG. 1.

The Node-B 403 then determines in S-412 whether the UE 401 has previously used a certain set of configuration parameters or not, based on the received UE identifier.

In case the answer to the interrogation in S-412 is affirmative, the Node-B 403 orders the UE 401 to apply the previously used set of configuration parameters in signal S-414.

In the event of a negative answer the Node-B 103 may order to UE to use the random access channel (RACH) procedure to transmit data, which was illustrated in step 216 in FIG. 2.

Above, brief descriptions of method steps of the Node-B 103 and the UE 101 have been provided.

In the following however, preferred embodiments of the present invention will be described.

These preferred embodiments comprise both method steps of the UE and the Node-B.

The procedure for enabling provision of fast access to a dedicated UL resource to the UE, comprises various phases that each reflect different time stamps of the procedure. In the following the first phase is described.

Phase 1—UE sending RACH

Figure 5:
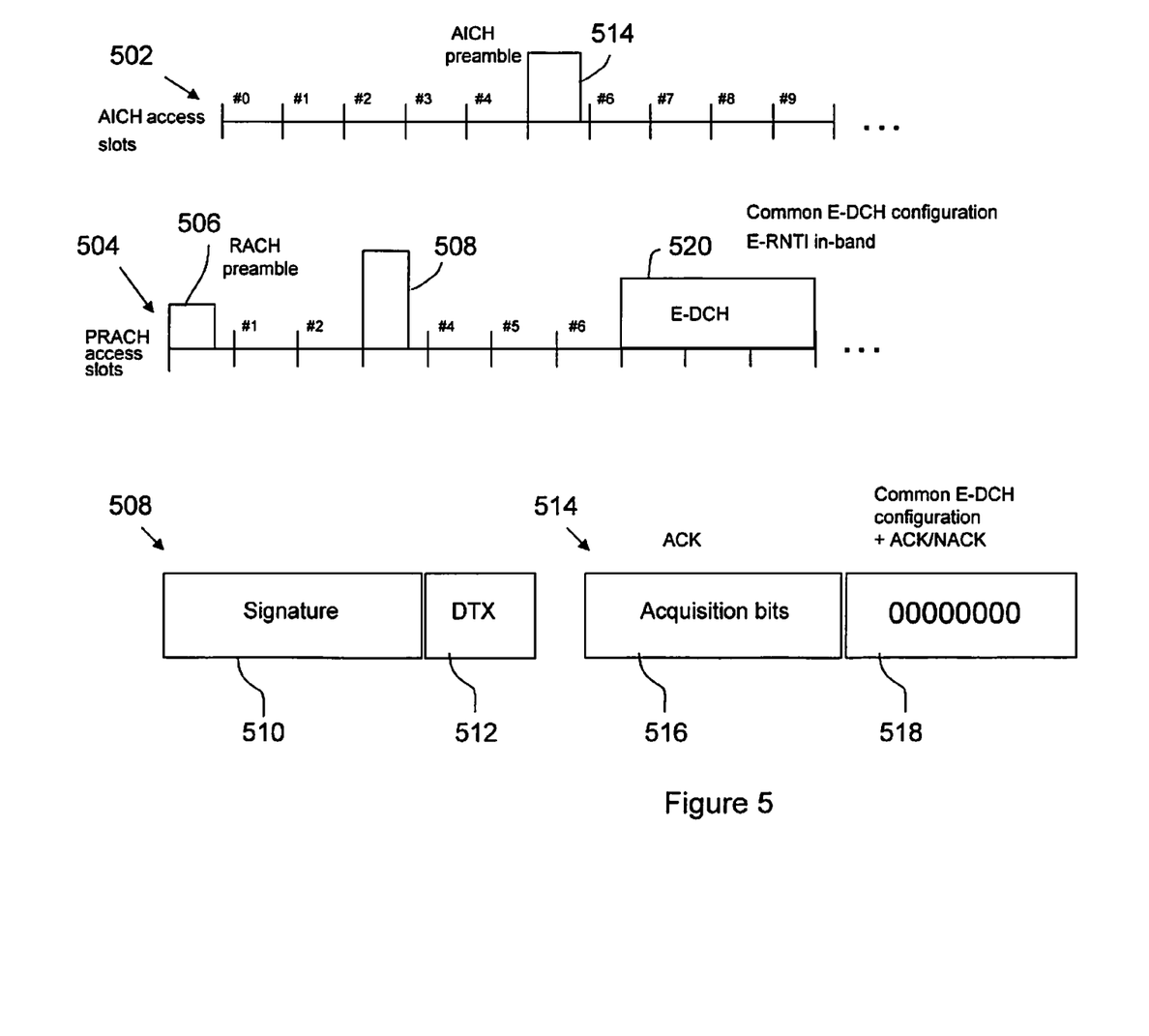
FIG. 5 illustrates signalling at least according to a first preferred embodiment of the present invention.
Figure 7:
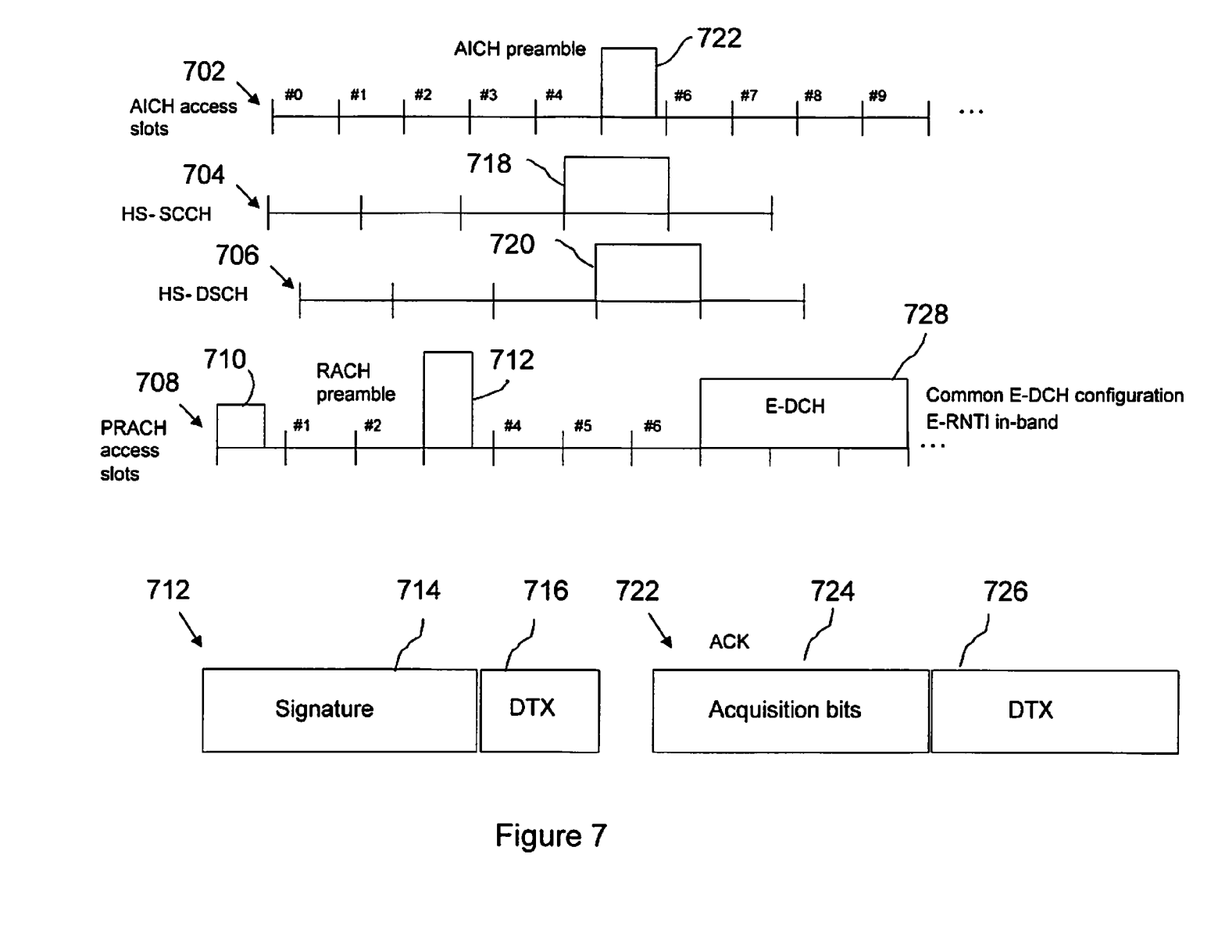
FIG. 7 illustrates signalling at least according to second and third preferred embodiments of the present invention.

In order to describe this first phase reference is made to FIGS. 5 and 7 illustrating signalling according to first, and second and third preferred embodiments, respectively.

In FIGS. 5 and 7 both Acquisition Indicator Channel (AICH) access slots 502, 702 as well as Physical random Access Channel (PRACH) access slots 504, 704 are presented.

In this phase the Random Access Channel (RACH) procedure is initiated when the UE wants to access a network for some reason such as, for instance, data being present in the UE's buffer. The RACH procedure is started by the UE by sending signals in the form of RACH preambles 506, 710 and 508, 712 to the Node-B at increasing power levels, so called power ramping.

In order to send a RACH preamble UE needs to choose a signature out of a set of 16 signatures. This signature may then be comprised in the first part of the RACH preamble 510, 714. The RACH preamble 508, 712 also comprises a second part 512, 716 that may be used for discontinuous transmission of data to the Node-B.

It can be mentioned that the step of transmitting the RACH preamble 712 corresponds to step 304 in FIG. 3 of transmitting a random access request, and to signal S-404 of a random access request for common resource as visualized in FIG. 4.

A certain number of these 16 signatures are reserved to apply to fast common E-DCH access, whereas the rest of the signatures may be used as defined in Rel '99, thus for the request of an unmodified AICH comprising the signature selected, corresponding to an UL access slot as selected.

This division of signatures may be broadcasted by the Node-B either over a DL broadcasting channel or a DL shared channel.

The UE can then randomly choose a signature within the signatures for fast common E-DCH access. As some signatures may be used as defined in Rel '99, the signatures to choose from for fast common E-DCH access is not totally random. It is only random within the signatures that are reserved to apply to fast common E-DCH access.

Within the second phase it is described the response to the RACH preamble 508, 712 which response is sent from the Node-B.

Whereas both FIGS. 5 and 7 illustrates the RACH procedure of phase 1, FIG. 5 only illustrates the procedure of phase 2 according to a first preferred embodiment. FIG. 7 further illustrates the procedure according to a second preferred embodiment, as shall be described down below.

First Preferred Embodiment of Phase 2—Node-B Sending AICH

Figure 6:
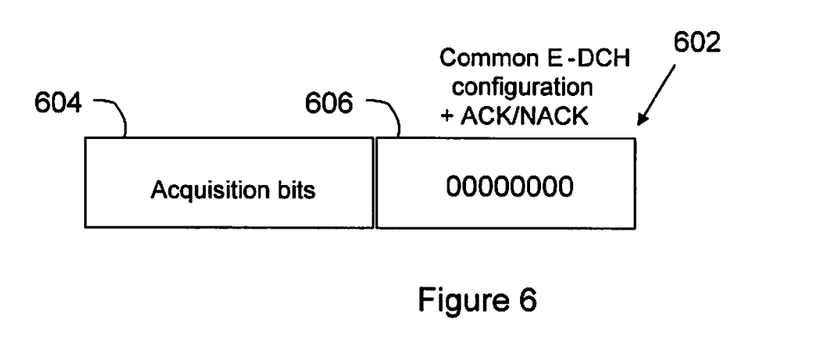
FIG. 6 illustrates an enhanced Acquisition Indicator Channel (AICH)

As FIG. 5 comprises an enhanced Acquisition Indicator Channel (AICH) 514, this is first introduced presented in FIG. 6 illustrating said enhanced AICH message.

Accordingly, an enhanced Acquisition Indicator Channel (AICH) 602 comprises a first part 604 comprising 4096 chips, and a second part comprising 1024 chips. The total enhanced AICH therefore comprises 5120 chips.

The first part 604 of the enhanced AICH 602 has the same meaning as in Rel '99, that is comprises information to the UE about the power per transmitted acquisition indicator.

In the second part 606 of the enhanced AICH 602, which is unused in Rel '99, the assigned common E-DCH configuration may be comprised. Also, the availability of the resources requested is comprised, n the form of an acknowledgement (ACK) or a negative acknowledgement (NACK). Information about common E-DCH configuration and resource availability may be encoded together or separately.

In FIG. 5 an enhanced AICH 514 is also presented, with its first 516 and second 518 parts, as described in the preceding paragraph.

According to this first preferred embodiment the Node-B sends the response to the UE in the form of an enhanced AICH preamble 514 on the Acquisition Indicator Channel (AICH), 502.

The enhanced AICH 514 has thus a total capacity of 5120 chips, of which 4096 chips of the first part 516 are used for acquisition bits. The second part 518, of 1024 chips of the total enhance AICH preamble 514 is now being used within this first preferred embodiment.

As stated above, the second part 518, 606 comprises information can be encoded regarding assigned common E-DCH configuration, and the resource availability for the resource as requested in the RACH preamble 508.

In this way the Node-B also broadcasts a set of common E-DCH configurations in the AICH preamble 514.

This AICH preamble 514 corresponds to step 208 of allocating the available common resource, as shown in FIG. 2, and as visualized in FIG. 4 as signal S-408 allocation of the available common resource, as sent by the Node-B 403.

First Preferred Embodiment of Phase 3—UE Receiving AICH

Within this phase the UE has to read the AICH preamble 514 and, if applicable, any other information, as sent by the Node-B.

Thus, the UE needs to read the AICH. Dependent on the information as comprised in the AICH preamble 514, three different cases are identified:

In case one, an affirmative acknowledgement (ACK) is comprised in both the first 516 and the second 518 part of the AICH preamble 514. In this case the UE applies the parameters given by the assigned configuration in the second part 518 and the UE starts to transmit on the common E-DCH resource 520.

In addition to reading the AICH preamble 514, The UE will also read the Fractional Dedicated Physical Channel (F-DPCH), the E-DCH Hybrid Automatic Repeat Query (ARQ) Indicator Channel (E-HICH) and E-DCH Absolute Grant Channel (E-AGCH).

Due to these signals the configuration as comprised in the enhanced AICH preamble 514 will be identified by a certain ID. Each configuration comprises a set of parameters which set may differ partially or totally from sets of parameters for other configurations. The configurations may comprise channelization codes, timing indicators, offsets, and signature sequences.

The received common E-DCH configuration carries information sufficient for the UE to start its transmission using the allocated common E-DCH resources Once the UE starts transmitting data on the E-DCH resource, UE must introduce its own E-RNTI in the messages for the purpose of contention resolution.

In the second of three identified cases, the UE receives an ACK of the first part 516 of the enhanced AICH 514 whereas a NACK is comprised in the second part 518 of the enhanced AICH preamble 514. In this case, the UE does apply any common E-DCH configuration and can therefore not use the common E-DCH resource. The UE will thus not transmit on the E-DCH.

However, the UE will instead transmit data following the RACH procedure using the same signature or another signature announced by the Node-B.

In this way, the UE is given a possibility to transmit data on RACH, in case there are no free common E-DCH resources.

In the third case, that is, if the first part of the enhanced AICH preamble 514 comprises a NACK, the UE has to stop its transmission, performs a back off and re-trial later.

Second Preferred Embodiment of Phase 2—Node-B Sending AICH and HS-SCCH/HS-DSCH

The second preferred embodiment of the present invention is presented, at least in part, in FIG. 7, illustrating a procedure for enabling provision of fast access to a dedicated UL resource to the UE.

As was explained under "phase 1", the UE transmits RACH preambles 710, 712 at increasing power levels.

As an answer to these signals, the Node-B sends a response back to the UE on the AICH in the form of an unmodified AICH preamble 722.

This AICH preamble 722 comprises a first part 724 of 4096 chips and a second part 726 of 1024 chips, of which the first part 724 of the AICH preamble 722 comprises the acquisition bits just as specified in Rel '99.

As soon as possible after the PRACH preamble 712 with sufficient power has been received by the Node-B, preferably before the AICH preamble 722 is sent, other information is communicated by the Node-B.

By using the High Speed-Shared Control Channel (HS-SCCH) 704 and the High Speed-Downlink Shared Channel (HS-DSCH) 706, a HS-SCCH message 718 and a HS-DSCH message 720 are sent by the Node-B, said messages comprising the assigned common E-DCH configuration, and the resource availability, being a response to request as sent by the UE in the RACH preamble 712.

As was described in connection to the first preferred embodiment, under "First preferred embodiment of phase 2", a common E-DCH configuration may be broadcasted on AICH.

According to the second preferred embodiment of phase 2 the common E-DCH configuration parameters may however be included in the HS-SCCH and HS-DSCH messages.

If there are no resources available at Node-B, Node-B may command the UE to retry the fast common E-DCH access later. Alternatively, the Node-B may command the UE to continue sending the message part, i.e. the RACH preamble 712, after a certain amount of time calculated by the Node B. In this case the UE will transmit the message part by using the same signature as was applied in the preamble 712 or by using another signature that may be assigned by the Node-B. All these commands may be sent in the HS-SCCH 718 and HS-DSCH 720 messages.

Node-B may not send the same configuration parameters to a UE different from the UE that has initially received said parameters, for instance in the HS-SCCH 718 and HS-DSCH 720 messages.

It can be pointed out the sending the HS-SCCH/HS-DSCH 718, 720 messages corresponds to step 208 of allocating the available common resource as depicted in FIG. 2, and to signal S-408, allocation of the available common resource, as sent by Node-B 403 and as illustrated in FIG. 4.

Second Preferred Embodiment Of Phase 3—UE Receiving AICH and HS-SCCHHS-/DSCH

Within this phase the UE has to read the message that was sent by the Node-B in phase 2.

As was described above for the first preferred embodiment of the present invention, the UE had to read the AICH preamble in phase 3.

Here, according to the second preferred embodiment of the present invention, the UE has to read the HS-SCCH 718 and HS-DSCH 720 messages.

When the UE sent the RACH preamble 712 in the fast E-DCH access procedure, the UE used one of the dedicated signatures. The UE therefore has to await either a new signature as comprised in HS-SCCH 718 and HS-DSCH 720 messages, or a defined timer expiration of the validity of signatures.

If the timer expires before the HS-SCCH and HS-DSCH messages have been received by the UE, the UE will start transmitting the message part of the RACH preamble 712 by using the same signature considered an ACK was received in the first part 724 of the AICH preamble 722. If on the other hand a NACK was comprised in said first part 724 of the AICH preamble 722, the UE will stop its transmission, perform a back off and re-try later.

In the case at least one of the HS-SCCH 718 and HS-DSCH 720 messages is received in time, the timer will thus not expire. Instead, whether or not to use the common configuration as comprised in the HS-SCCH and HS-DSCH message is dependent on the resource availability as communicated by the Node-B.

In case one, an affirmative acknowledgement (ACK) is comprised in both the HS-SCCH/HS-DSCH 718, 720 messages, and in the AICH preamble 722. In this case, the UE applies the parameters given by the assigned configuration in the HS-SCCH/HS-DSCH 718, 720 messages, and UE the UE starts to transmit on the common E-DCH resource 728.

In addition to reading the HS-SCCH/HS-DSCH messages 718, 720, the UE will also read the F-DPCH, the E-HICH, and the E-AGCH.

Once the UE starts transmitting data on common E-DCH resource 728, the UE must introduce its own E-RNTI in the messages for the purpose of contention resolution.

In a second case, the UE receives a NACK both in the HS-SCCH/HS-DSCH messages 718, 720 and in the AICH preamble 722. In this case, the UE will not apply any common E-DCH configuration and will accordingly not transmit using the E-DCH resource 728.

However, the UE will transmit data following the RACH procedure by using the same signature or alternatively another signature if announced by the Node-B. Data may thus be transmitted even though no common E-DCH resource is available.

Alternatively, the process of requesting a common E-DCH resource may be started from the beginning by again sending a RACH preamble 712 using a signature, as described above.

In the third case, that is if a NACK is comprised in either the HS-SCCH/HS-DSCH 718, 720 messages, or the AICH preamble 722, the UE must stop its transmission, perform a back off and re-try later.

Third Preferred Embodiment of Phase 2 and 3—Sending and Receiving AICH and HS-SCCH/HS-DSCH According to a third preferred embodiment of the present invention the Node-B sends a response message to the UE, as a response to the RACH preamble. This response message is an AICH preamble that is not modified, in the same way as was described for the second preferred embodiment of phase 2. For this reason reference can be made to FIG. 7 presenting part of the procedure according to the second embodiment of the present invention. The AICH message as sent in this third embodiment of phase 2 may thus be the 722 message.

However, the meaning of the acquisition bits for the signatures in the signature set for fast E-DCH access according this third embodiment, is modified as compared to the meaning as described above for the second embodiment of phase 2 and phase 3.

The acquisition bits which correspond to an acknowledgement (ACK) of the chosen signature, as sent by the AICH preamble mean that Node-B has been able to reserve resources for fast E-DCH access for the UE. The UE goes on to receive the E-DCH configuration over HS-SCCH 718 and HS-DSCH 720, as was described for the second embodiment of phase 2.

The acquisition bits which correspond to a negative acknowledgement (NACK) of the chosen signature means that the Node-B was not able to reserve resources for fast E-DCH access for the UE. However this NACK message means that the Node-B has reserved resource for reception of data using the RACH message part.

This means that Node-B reserves either resources for fast E-DCH access or resources for reception of data using the RACH message. The UE transmission attempt is thus not rejected completely and Node-B will have to be prepared to receive either an E-DCH transmission or a RACH message part.

According to another alternative implementation, the meaning of ACK and NACK could be reversed. In such an implementation the affirmative acknowledgement as communicated by the AICH preamble 722 would mean that the Node-B has reserved resources for reception of the RACH message part. A negative acknowledgement would however mean that the Node-B was able to reserve resources for fast E-DCH access.

In this implementation, the interpretation of the NACK is different from Rel '99, whereas the interpretation of the ACK is the same as in Rel '99, which could bring this implementation to be more backwards compatible, as compared to above description of the third embodiment of phase 2.

Depending on contents of the AICH preamble, comprising either a ACK or a NACK for the chosen signature, the UE can thus either transmit an E-DCH message 728 using the assigned common E-DCH configuration or transmit a RACH message part as described above, with the meaning of the negative and affirmative acknowledgements as described above.

In the case the UE can obtain the assigned common E-DCH configuration without dynamic transmission, for instance in case there is only one configuration in use, or in case the configuration is given by the UE ID or by the signature, it may not be necessary to transmit the assigned common E-DCH configuration as part of the response message from Node-B, when responding to the RACH preamble request as sent by the UE. This is applicable for all three preferred embodiments of phase 2 and 3.

Phase 4—UE Transmitting E-DCH; Node-B Receiving E-DCH

Figure 8:
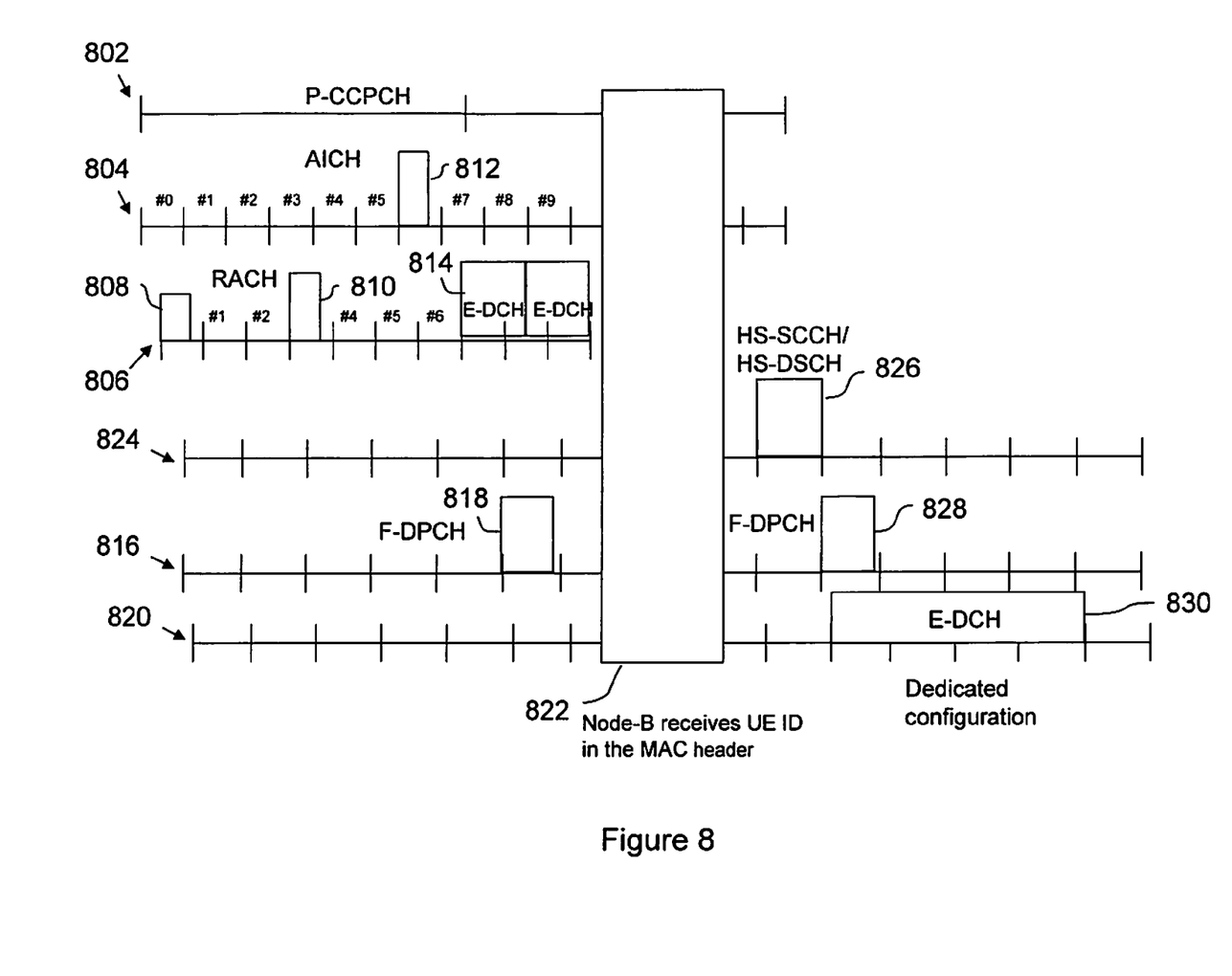
FIG. 8 illustrates signalling at various phases at least according to the first preferred embodiment of the present invention.
Figure 9:
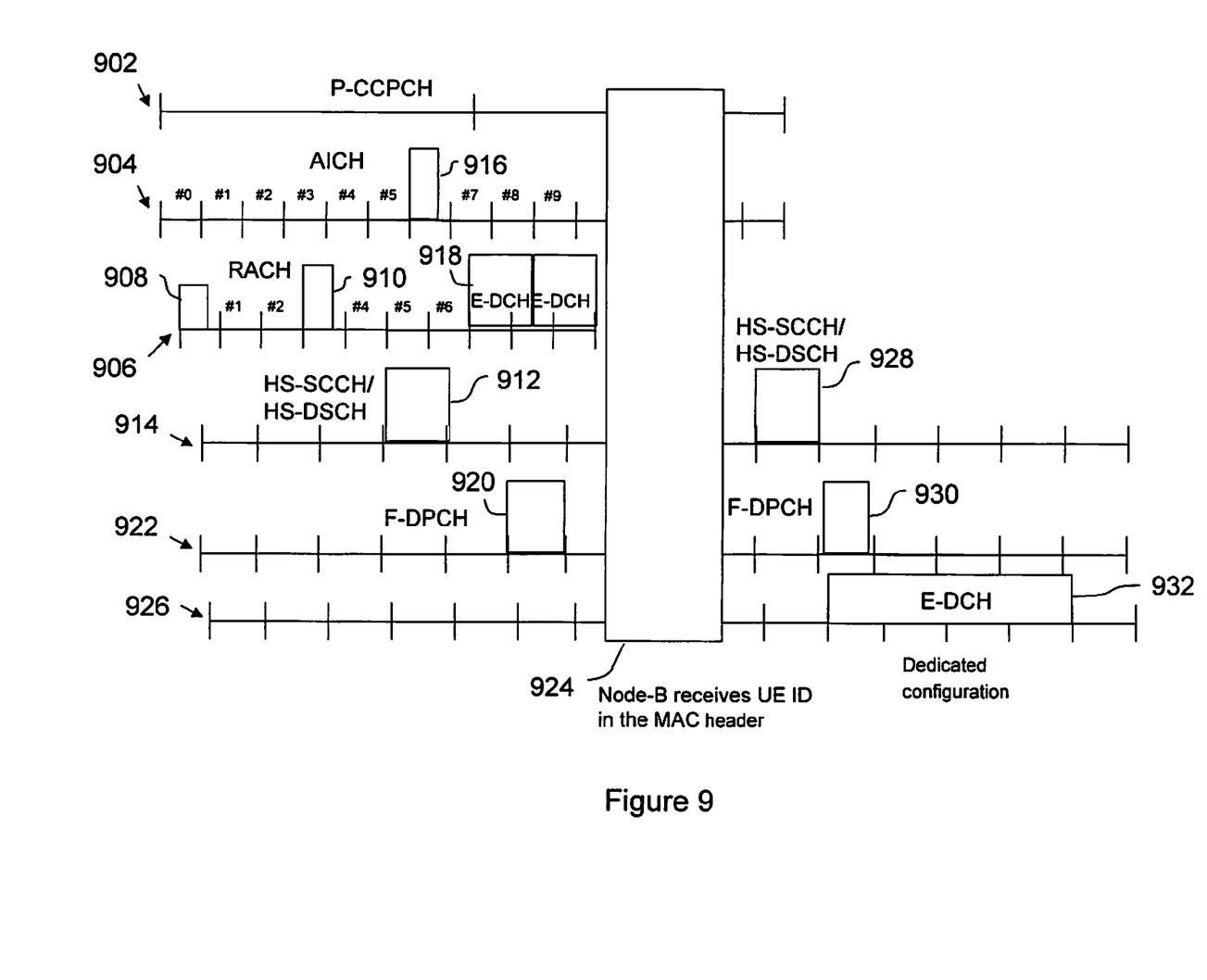
FIG. 9 illustrates signalling at various phases at least according to the second and third preferred embodiments of the present invention.

This phase, but also future as well as the previous phases, are shown in FIGS. 8 and 9 for the preferred first, and second or third embodiments, respectively.

As earlier described, the UE sends RACH preambles on PRACH 806, 906 at increasing power 808, 810 and 908, 910 until a response can be received from the Node-B.

The Node-B thus responses on the AICH 904 by sending an extended AICH preamble 812 according to the first preferred embodiment, or by sending an ordinary unmodified AICH preamble 916 according to the second and third embodiments of the present invention.

These RACH preamble and AICH preambles have their correspondence in steps and signals in previous figures as described hereinbefore.

After the UE has received the AICH preamble 812 in FIG. 8 or the AICH preamble 916 and HS-SCHH/HS-DSCH 912, the UE can thus start sending its data using the common E-DCH resource 814, 918 when commanded by the Node-B after a certain offset time, by applying the parameters given in the common E-DCH configuration as assigned by the Node-B.

The Node-B will now also send power control commands to the UE in the assigned Fractional Dedicated Physical Channel (F-DPCH) 818, 920. In addition, the E-DCH Hybrid Automatic Repeat Query (ARQ) Indicator Channel (E-HICH) message and E-DCH Absolute Grant Channel (E-AGCH) messages are sent from the Node-B to the UE, where they are identified by the UE.

For the reason to enable the Node-B to identify the UE, the UE will send packets in the Medium Access Control (MAC) header 822, 924 in the form of the E-DCH Radio Network Temporary Identity (E-RNTI) 822, 924.

As the Node-B receives these packets, they are processed to identify UE through said E-RNTI.

The Node-B receiving the E-RNTI in the MAC header 822, 924 corresponds to step 210 in FIG. 2, receiving a UE identifier, and to step 308 in FIG. 3, transmitting a UE identifier on the common resource, wherein the identifier indicates a previously used set of configuration parameters from a dedicated resource. In addition, there is a correspondence found in signal S-410 in FIG. 4, UE identifier communicated on allocated common resource.

Phase 5—Node-B Receiving UE ID, Acknowledging Data from UE

Once the Node-B has uniquely identified the UE based on the sent E-RNTI in the MAC header, the Node-B will acknowledge the data sent by the UE. In addition the Node-B may also send timing information.

The Node-B will now command the UE to use its own E-DCH configuration. This dedicated E-DCH configuration was stored in the Node-B when UE was in CELL_DCH mode for the first time.

The Node-B may send this information through the HS-SCCH/HS-DSCH 826, 928 or by using any other channels suitable for this.

A correspondence in earlier figures can be identified in step 214, the Node-B ordering the UE to apply the set of previously used configuration parameters, and in signal S-414 comprising the order to apply the set of configuration parameters that were previously used, as illustrated in FIG. 4.

Phase 6—UE Receiving Parameters; Transmitting Using Dedicated E-DCH Resources Once the UE has received the HS-SCCH/HS-DSCH 828, 928 information, the UE reads and applies the received new parameters of the dedicated E-DCH configuration. The UE also reads the F-DPCH 828, 930, E-HICH and E-AGCH messages by using the information given by the Node-B.

The UE can thus now transmit data to the Node-B by using its own dedicated E-DCH resource 830, 932.

Phase 7—Node-B Receiving UE Data; Releasing Common E-DCH Resource

As the Node-B receives data from the UE as sent on the UE's dedicated E-DCH resource 830, 932, the Node-B releases the common E-DCH resources 814, 918 as used previously in phase 4. The Node-B will then return these common E-DCH resources to the pool of free common E-DCH resources.

This step of releasing the common E-DCH resources corresponds to signal S-110 releasing of common E-DCH in the basic signalling scheme for signalling for providing fast access to a dedicated UL resource, as illustrated in FIG. 1.

In the case the Node-B has not received any data either in the common E-DCH configuration in phase 4 or in the dedicated E-DCH configuration within a certain time, the Node-B assumes that the UE has no more data in its buffer, upon which the Node-B releases the allocated common of dedicated E-DCH resources.

Node-B will now also send power control commands to the UE in the assigned Fractional Dedicated Physical Channel (F-DPCH) 818, 920

As was mentioned above under phase 4, the Node-B sends power control commands to the UE in the assigned Fractional Dedicated Physical Channel (F-DPCH), in order to perform power control. Indirectly, also power control commands may also be sent through the E-AGCH.

As for the implementation of the above-described methods, the methods may be implemented by software executed on a processor in a Node-B or a base station (BS) where applicable or on a processor unit of a user equipment (UE).

Any examples and terminology relating to a 3GPP LTE standard being used herein should not be seen as limiting the scope of the invention, the methodology of which in principle can be applied to any communication system.

The described subject matter is of course not limited to the above-described embodiments, but can be modified within the scope of the enclosed claims.

It is emphasized that the present invention can be varied in many ways. The presented embodiments of the present invention are only a few examples of the variety of embodiments that are comprised within the present invention. These different embodiments are hence non-limiting examples.

The following advantages can be identified of at least some of the embodiments:

At least some embodiments of the present invention provide the advantages of reducing UL set-up delays for the setup between the UE and the Node-B and consequently improve the performance from the network perspective and the quality of experience from the end-user perspective.

An enhanced background traffic level can be permitted, as common E-DCH resources can be accesses in a fast way, according to at least some embodiments of the present invention.

What is claimed is:

1. A method in a base station for obtaining a user equipment (UE) identifier enabling provision of fast access to a dedicated uplink (UL) resource to a UE for data transmissions comprising the steps of:

transmitting configuration parameters of a set of common UL resources to said UE;

receiving a random access request for a common resource from said UE;

determining whether at least one of the common resources of said set of common UL resources is available; and in case the at least one of the common resources is available:

allocating an available common resource to said UE;

receiving a UE identifier from said UE transmitted on said allocated common resource, wherein the UE identifier comprises an Enhanced Dedicated Channel (E-DCH) Radio Network Temporary Identity (E-RNTI);

determining, based on said UE identifier, whether said UE has previously used a certain set of configuration parameters for a dedicated resource;

if the UE has previously used the certain set of configuration parameters, ordering said UE to apply said certain set of configuration parameters for providing said dedicated UL resource to the UE for data transmissions; and if said UE has not previously used said certain set of configuration parameters for the dedicated resource, ordering the UE to use a Random Access Channel (RACH) procedure to transmit data.

2. The method according to claim 1, wherein the configuration parameters of said set of common UL resources are transmitted to said UE on a broadcast channel or on at least one of a High Speed Shared Control physical Channel (HS-SCCH), and a High Speed Downlink Shared Channel (HS-DSCH).

3. The method according to claim 1, wherein information related to said common resource allocation is transmitted to said UE on an acquisition indicator channel (AICH).

4. The method according to claim 1, wherein said set of configuration parameters comprises a configuration identifier and at least one selected from a group consisting of a set of channelization codes, timing indicators, offsets and a signature sequence.

5. A method in a user equipment (UE), for providing an identifier of said UE enabling provision of fast access to a dedicated uplink (UL) resource to a base station for data transmissions, comprising the steps of:

receiving configuration parameters of a set of common UL resources from said base station;

transmitting a random access request for a common UL resource of said set of common UL resources to said base station;

obtaining allocation of said common UL resource of said set of common UL resources from said base station;

transmitting a UE identifier to said base station on said common UL resource, said UE identifier indicating whether a certain set of configuration parameters was previously used for a dedicated resource, wherein the UE identifier comprises an Enhanced Dedicated Channel (E-DCH) Radio Network Temporary Identity (E-RNTI);

if said UE has previously used said certain set of configuration parameters, receiving an order from said base station to apply said certain set of configuration parameters for providing said dedicated UL resource for data transmission; and if said UE has not previously used said set of configuration parameters, receiving an order from said base station, ordering the UE to use a Random Access Channel (RACH) procedure to transmit data.

6. The method according to claim 5, wherein the configuration parameters of said set of common UL resources are received from said base station on a broadcast channel or on at least one of a High Speed Shared Control Channel (HS-SCCH), and a High Speed Downlink Shared Channel (HS-DSCH).

7. The method according to claim 5, wherein allocation in the step of obtaining allocation of said common UL resource of said set of common UL resources from said base station is obtained on an Acquisition Indicator Channel (AICH).

8. A base station operable to provide fast access to a dedicated uplink (UL) resource to a user equipment (UE) for data transmissions, wherein the base station comprises:

processing circuitry configured to transmit configuration parameters of a set of common UL resources to said UE;

the processing circuitry further configured to receive a random access request for a common resource from said UE;

the processing circuitry further configured to determine whether at least one of the common resources of said set of common UL resources is available; and in case the at least one of the common resources is available:

the processing circuitry further configured to allocate an available common resource to said UE;

the processing circuitry further configured to receive a UE identifier from said UE transmitted on said allocated common resource, wherein the UE identifier comprises an Enhanced Dedicated Channel (E-DCH) Radio Network Temporary Identity (E-RNTI);

the processing circuitry further configured to determine, based on said UE identifier, whether said UE has previously used a certain set of configuration parameters for a dedicated resource;

the processing circuitry further configured, if the UE has previously used the certain set of configuration parameters, to order said UE to apply said certain set of configuration parameters for providing said dedicated UL resource to the UE for data transmissions; and the processing circuitry further configured, if said UE has not previously used said certain set of configuration parameters for the dedicated resource, to order the UE to use a Random Access Channel (RACH) procedure to transmit data.

9. A user equipment (UE) operable to provide fast access to a dedicated UL resource to a base station for data transmissions, wherein the UE comprises:

processing circuitry configured to receive configuration parameters of a set of common UL resources from said base station;

the processing circuitry further configured to transmit a random access request for a common UL resource of said set of common UL resources to said base station;

the processing circuitry further configured to obtain allocation of said common resource of said set of common UL resources from said base station;

the processing circuitry further configured to transmit a UE identifier to said base station on said common resource, said UE identifier indicating whether a certain set of configuration parameters was previously used for a dedicated resource, and wherein the UE identifier comprises an Enhanced Dedicated Channel (E-DCH) Radio Network Temporary Identity (E-RNTI);

the processing circuitry further configured, if said UE has previously used said certain set of configuration parameters, to receive an order from said base station to apply said certain set of configuration parameters for providing said dedicated UL resource for data transmission; and the processing circuitry further configured, if said UE has not previously used said certain set of configuration parameters, to receive an order from said base station, ordering the UE to use a Random Access Channel (RACH) procedure to transmit data.

* * * * *